(12) United States Patent
Kauhaniemi et al.

(10) Patent No.: US 10,209,801 B2
(45) Date of Patent: *Feb. 19, 2019

(54) BENDABLE DEVICE WITH DISPLAY IN MOVABLE CONNECTION WITH BODY

(71) Applicant: Microsoft Technology Licensing, LLC, Redmond, WA (US)

(72) Inventors: Ilpo Kauhaniemi, Vantaa (FI); Esa Määttä, Espoo (FI); Lassi Hyvönen, Helsinki (FI); Jussi Ropo, Espoo (FI); Vicente Calvo Alonso, Kaarina (FI); Catalin Gheorghiu, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/684,937

(22) Filed: Aug. 23, 2017

(65) Prior Publication Data

US 2018/0067598 A1 Mar. 8, 2018

Related U.S. Application Data

(63) Continuation of application No. 14/855,997, filed on Sep. 16, 2015, now Pat. No. 9,778,772.

(51) Int. Cl.
*G02F 1/1333* (2006.01)
*G06F 3/041* (2006.01)
(Continued)

(52) U.S. Cl.
CPC .......... *G06F 3/0412* (2013.01); *G06F 1/1652* (2013.01); *G09G 3/3225* (2013.01);
(Continued)

(58) Field of Classification Search
CPC .... G06F 3/0412; G06F 1/1652; G09G 3/3225
(Continued)

(56) References Cited

U.S. PATENT DOCUMENTS 5,377,820 A 1/1995 Christman
6,353,188 B1 3/2002 Fernandez
(Continued)

FOREIGN PATENT DOCUMENTS

EP 2728433 A1 5/2014
EP 2765479 A2 8/2014
(Continued)

OTHER PUBLICATIONS

"Flexible Magnets", Retrieved From: <<http://www.arnoldmagnetics.com/en-us/Divisions/Flexmag>>, Sep. 16, 2015, 2 Pages.
(Continued)

*Primary Examiner* — Calvin C Ma

(57) ABSTRACT

A bendable device is provided. The device comprises: a body comprising a bending region and a flexible display stack comprising at least one active layer and a supporting layer positioned on the bottom of the flexible display stack. The supporting layer of the flexible display stack comprises one or more fastening areas; the body comprises one or more fastening components; and one or more fastening components of the body are configured to be operable in a movable connection with one or more fastening areas of the flexible display stack.

20 Claims, 7 Drawing Sheets

(51) Int. Cl.
*G09G 3/3225* (2016.01)
*H04M 1/02* (2006.01)
*G06F 1/16* (2006.01)

(52) U.S. Cl.
CPC ......... *H04M 1/0268* (2013.01); *G06F 1/1616* (2013.01); *G06F 2203/04102* (2013.01); *G06F 2203/04103* (2013.01)

(58) Field of Classification Search
USPC .............................. 345/1.2, 173, 174; 349/58
See application file for complete search history.

(56) References Cited

U.S. PATENT DOCUMENTS

| | | | |
|---|---|---|---|
| 7,661,732 | B2 | 2/2010 | Hsu et al. |
| 8,251,411 | B2 | 8/2012 | Yang |
| 8,271,047 | B2 | 9/2012 | Kim et al. |
| 8,648,679 | B2 | 2/2014 | Lauder et al. |
| 8,755,180 | B2 | 6/2014 | Yeh et al. |
| 8,804,324 | B2 | 8/2014 | Bohn et al. |
| 8,804,349 | B2 | 8/2014 | Lee et al. |
| 8,899,636 | B2 | 12/2014 | Fitzgerald et al. |
| 8,953,310 | B2 | 2/2015 | Smith et al. |
| 9,007,157 | B2 | 4/2015 | Ow et al. |
| 9,778,772 | B2 * | 10/2017 | Kauhaniemi ......... G06F 3/0412 |
| 2006/0146488 | A1 | 7/2006 | Kimmel |
| 2010/0265668 | A1 | 10/2010 | Yuen et al. |
| 2010/0312625 | A1 | 12/2010 | Miller et al. |
| 2011/0140995 | A1 | 6/2011 | Hamers et al. |
| 2012/0066865 | A1 | 3/2012 | Lauder et al. |
| 2012/0194448 | A1 | 8/2012 | Rothkopf |
| 2012/0314399 | A1 | 12/2012 | Bohn et al. |
| 2013/0342090 | A1 | 12/2013 | Ahn et al. |
| 2014/0054557 | A1 | 2/2014 | Jung et al. |
| 2014/0059850 | A1 | 3/2014 | Zhou |
| 2014/0099479 | A1 | 4/2014 | Krall et al. |
| 2014/0126133 | A1 | 5/2014 | Griffin et al. |
| 2014/0196254 | A1 | 7/2014 | Song |
| 2014/0226275 | A1 | 8/2014 | Ko et al. |
| 2014/0295150 | A1 | 10/2014 | Bower et al. |
| 2015/0016051 | A1 | 1/2015 | Herring et al. |
| 2015/0233162 | A1 | 8/2015 | Lee et al. |
| 2015/0277496 | A1 | 10/2015 | Reeves et al. |
| 2016/0226015 | A1 | 8/2016 | Kauhaniemi et al. |

FOREIGN PATENT DOCUMENTS

| | | |
|---|---|---|
| WO | 2013175212 A2 | 11/2013 |
| WO | 2014130967 A2 | 8/2014 |
| WO | 2015008009 A1 | 1/2015 |

OTHER PUBLICATIONS

"Flexible Strong Rubber Magnet Sheet", Retrieved From: <<http://www.alibaba.com/product-detail/flexible-strong-rubber-magnet-sheet_1393515062.html<<, May 7, 2015, 8 Pages.

"Micro PEM Fasteners", Retrieved From: <<https://www.pemnet.com/fastening-products/micro/>>, May 12, 2015, 4 Pages.

Daniel P., "Samsung Demos Foldable Display Concepts, including a Phone-to-Tablet Device", Retreived From: <<https://www.phonearena.com/news/Samsung-demos-foldable-display-concepts-including-a-phone-to-tablet-device_id49131>>, Nov. 7, 2013, 6 Pages.

"Non Final Office Action Issued in U.S. Appl. No. 14/855,997", dated Nov. 4, 2016, 13 Pages.

"Notice of Allowance Issued in U.S. Appl. No. 14/855,997", dated May 23, 2017, 7 Pages.

"International Preliminary Report on Patentability Issued in PCT Application No. PCT/US2016/045668", dated Nov. 29, 2017, 9 Pages.

"International Search Report and Written Opinion Issued in PCT Application No. PCT/US2016/045668", dated Nov. 9, 2016, 11 Pages.

"Second Written Opinion Issued in PCT Application No. PCT/US2016/045668", dated Aug. 10, 2017, 7 Pages.

Svensson, Peter, "Gadget Watch: Samsung shows Bendable Phone Screen", Retrieved From: <<http://phys.org/news/2013-01-gadget-samsung-bendable-screen.html>>, Jan. 10, 2013, 3 Pages.

* cited by examiner

```
┌─────────────────────────────────────┐
│   METHOD FOR ASSEMBLING A           │
│   BENDABLE DEVICE WITH DISPLAY      │
└─────────────────────────────────────┘
                  │
┌─────────────────────────────────────┐
│  Providing display stack comprising │
│  bottom supporting layer with studs │
└─────────────────────────────────────┘
  61              │
┌─────────────────────────────────────┐
│  Providing body with bending region │
│     and keyhole shaped grooves      │
└─────────────────────────────────────┘
  62              │
┌─────────────────────────────────────┐
│ Fixing display stack to body by     │
│ inserting studs into grooves        │
└─────────────────────────────────────┘
  63
```

FIGURE 6

METHOD FOR ASSEMBLING A
BENDABLE DEVICE WITH DISPLAY

71 — Providing display stack comprising bottom supporting layer with magnets

72 — Providing body with bending region and magnets

73 — Fixing display stack to body by bringing magnets together

FIGURE 7

BENDABLE DEVICE WITH DISPLAY IN MOVABLE CONNECTION WITH BODY

CROSS REFERENCE TO RELATED APPLICATIONS

This application is a continuation of and claims priority to U.S. application Ser. No. 14/855,997, entitled "BENDABLE DEVICE WITH DISPLAY IN MOVABLE CONNECTION WITH BODY," filed Sep. 16, 2015, which is incorporated herein in its entirety.

BACKGROUND

Technology of bendable multilayer electronic devices is becoming increasingly relevant in flexible displays and touch surfaces. Many customer electronics manufacturers are applying the bendable technology to handheld devices, laptops, wearable devices, and other consumer electronics. Integration of bendable or flexible layers with the rest of the device has an influence on the stresses that appears between the different layers, and on the possibility of replacement of individual elements.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A device and methods are presented. The electronic device comprises a body and a flexible display stack. The display stack and the body are in a movable connection via fastening areas and fastening components. In embodiments, the fastening areas and components may include studs and grooves and/or magnets. The methods disclosed relate to the way the display stack is fixed to the body, via magnets brought in proximity to each other and via studs locking into grooves.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 6 is a flow chart of a method according to an embodiment;

FIG. 7 is a flow chart of a method according to an alternative embodiment.

Like reference numerals are used to designate like parts in the accompanying drawings.

DETAILED DESCRIPTION

The detailed description provided below in connection with the appended drawings is intended as a description of the present embodiments and is not intended to represent the only forms in which the present invention may be constructed or utilized. However, the same or equivalent functions and sequences may be accomplished by different embodiments.

The embodiments described below are not limited to implementations which solve any or all of the disadvantages of known devices and covers. Although the present examples are described and illustrated herein as being implemented with a stack of few layers connected to a body, the devices described are provided as an example and not a limitation. As those skilled in the art will appreciate, the presented embodiments are suitable for application in a variety of bendable devices comprising multiple stacks of layers, and the individual elements can be a schematic representation of various parts of a device, such as a display or a touch screen. These parts may comprise a plurality of different layers and other elements in between the body and the display stack.

In bendable or flexible electronic devices, such as FOLED (Flexible Organic Light Emitting Diode) devices, the display part of the device has to be attached to the main body in a way that does not prevent or resist bending of the device.

Figure 1:
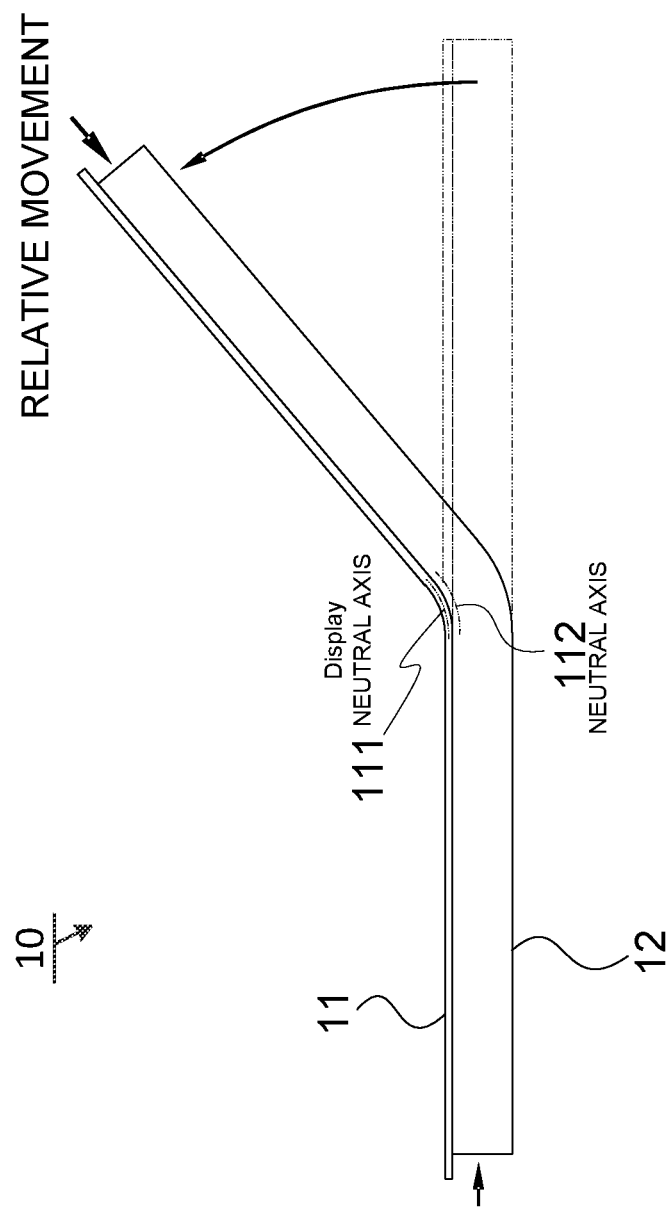
FIG. 1 is a schematic side view of a bendable device with a display.

FIG. 1 is a schematic illustration of a bendable device 10 which comprises a display stack 11 and a body 12. The device 10 may be, but is not limited to, a bendable electronic device, a bendable handheld electronic device or a foldable electronic device. Structural features of devices according to embodiments are described in more detail with reference to FIGS. 2-5B; and the side view of FIG. 1 serves to illustrate the mechanism of relative movement that occurs when the device 10 is bent. When a device 10 is bent or folded, and the display stack 11 is movably fixed to the body 12, movement of the display stack 11 occurs relative to the body 12 similar to relative movement of pages of a stack of papers when bent. This movement occurs due to different neutral axes for the stack 11 and body 12. A neutral axis of bending is the axis where no compression or extension occurs, and it is usually lies inside the structure that is being bent. Unless the stack 11 and the body 12 are in a rigid connection along the whole surface, they bend as two individual structures. The first neutral axis 111 of the flexible display stack normally lies above the second neutral axis 112 of the body 12, which leads to their relative movement. This relative movement is present in embodiments described below which provide a movable connection between at least parts of the display stack 11 and the body 12. The approximate neutral axis 111 and possible bending direction are shown in FIG. 2 by dashed lines and arrows.

Figure 2:
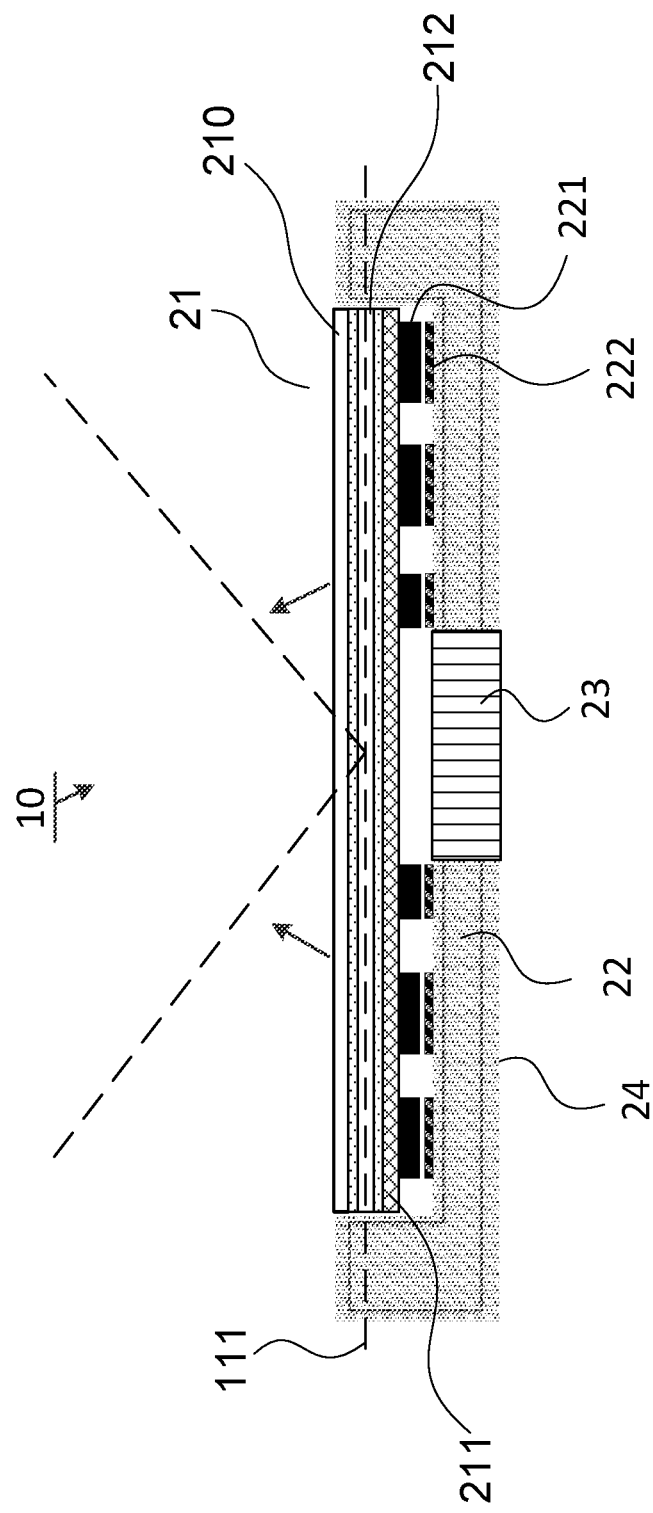
FIG. 2 is a schematic side view of a device according to an embodiment.

FIG. 2 shows a bendable device 10 according to an embodiment. The device 10 may be, but is not limited to, a bendable electronic device, a bendable handheld electronic device or a foldable electronic device. This Figure is a side cross-section view of the device 10. The device 10 comprises a display stack 21 which comprises at least one active layer 212 and a supporting layer 211 on the bottom. The display stack 21 may also comprise a window layer 210 on the top. This provides protection of the other layers and the internal parts of the device 10. The supporting layer 211 may comprise stainless steel or other metal. The supporting layer 211 may also have a bending region and comprise rigid material, as discussed in more detail below.

The device 10 further comprises and a body portion 22 with a bending region 23. The bending region 23 may be an extendable hinge, a hinge with rotating elements or any other hinge. A particular type of hinge may be appropriate for the desired type of bending of the device 10. Alternatively, the bending region 23 may be an elastic component, for example a rubber component. The bending region 23 may have any width or shape. In an embodiment, the region 23 may span across the body 22 of the device 10. The body 22 may also comprise more than one extendable region 23, for example if the device 10 is bendable about more than one axis.

The supporting layer 211 comprises one or more fastening areas 221, and the body 22 comprises one or more fastening components 222. The fastening components 222 are configured to be operable in a movable connection with the fastening areas 221. They are shown on FIG. 2 only schematically and may have any appropriate shape, size and properties to provide a movable connection. The term "movable connection" herein refers to a connection which allows free movement of connected elements in at least one direction within a limited range.

The above embodiments can provide a technical effect of easy bending due to movable connection points, while preventing detachment of the display stack at any point during bending.

In an embodiment, the device 10 is bendable about at least one axis in the bending region 23. This axis can be, for example, the axis of a hinge. At least one of the fastening components 222 and at least one of the fastening areas 221 are positioned within 2 centimeters from the bending region 23 and opposite to each other. Since the display stack 21 can be likely to detach near the bending region 23, this embodiment can have an effect of reliable fastening the stack 21 near the bending region 23. In an embodiment, the body 22 and the stack 21 are bendable more than 90 degrees. This provides substantially a foldable device.

The body 22 may optionally comprise a casing 24, as shown in FIG. 2. The casing 24 can comprise the bending region 23 of the body 22 and enclose the body 22 and the display stack 21 at least from the bottom and two opposite sides. The casing 24 may also include a frame which encloses at least two edges of the stack 21. The frame is not shown on the figure but could be, for example, a stripe on the top parts of the casing 24 covering its edges and extending slightly over the window layer 210. This can prevent the stack 21 from moving vertically. In an embodiment, the casing and the frame comprise metal and/or plastic.

The terms 'top' and 'bottom' are used for clarity and relate to the positioning on the figures only. The bottom supporting layer 212 may be positioned on any geometric side of the device 10.

Active layers 212 of the display stack 21 may comprise an active display layer and an active touch sensing layer, for example if the device 10 is a bendable touch screen device. One of the layers of the display stack 21 may also be a polarizing layer, for example if the display stack is an LCD (Liquid Crystal Display) stack. In an embodiment, layers of the display stack 21 are fixed to each other and to the window layer 210 by an optically clear adhesive, such as LOCA (liquid optically clear adhesive). Layers of the display stack 21 are thereby laminated to each other with a transparent adhesive. On FIG. 2, the adhesive is schematically illustrated as a dotted filling between layers of the stack 21.

The term 'bendable' used herein includes both a bending radius that is large with respect to the display thickness and also small with respect to the display thickness. For example, bendable displays include displays that are 3 mm thin and may operate in a bent form in which the bend radius is 5 cm or less than 1 mm. In the latter bend radius of less than 1 mm, the display may be described as foldable, similar to a folded sheet of paper. Furthermore, 'bendable' refers to dynamic bending, and includes both elastic and inelastic plasticity. Embodiments of the device 10 can apply to display devices as well as any other devices which include displays. The display may be, for example, a flexible organic light emitting diode (OLED) display, an LCD or an electronic paper display.

The body 22 of the device 10 may comprise other elements required for operation of the device 10. For example, if the device 10 is an electronic device, the body 22 of the device may comprise elements such as a controller, a processing unit, and a memory.

According to an embodiment, the display stack 21 has an electric connection with the body 22. The electric connection can be implemented as a flexible connector, for example via a flexible printed circuit (FPC), to the hardware of the device 10 located in the body 22. The connection can be implemented inside the device 10 and made with one of the active layers 210 of the display stack 21. The body 22 may have an opening which allows the flexible connector to extend through the opening into the space between the display stack 21 and the body 22, and move without damage or loss of connection inside that space when the device 10 is bent.

In an embodiment, thickness of the display stack may be between 0.1 and 0.5 millimeters.

Figure 3A:
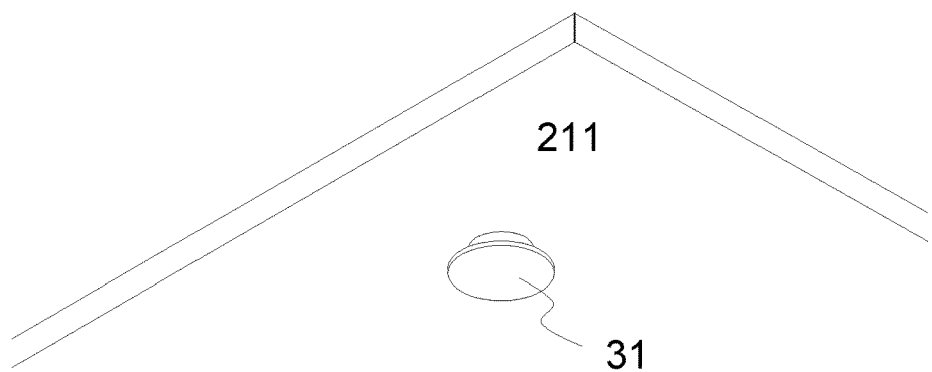
FIG. 3A is an angled view of a supporting layer comprising a metal stud according to an embodiment.
Figure 3B:
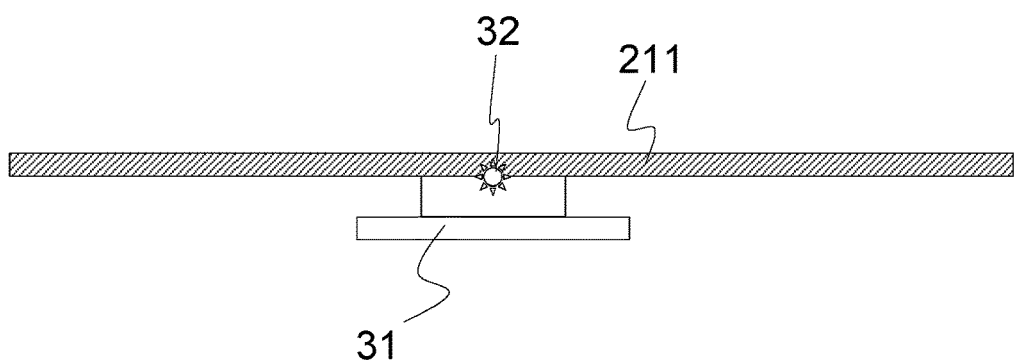
FIG. 3B is a side view of a supporting layer comprising a metal stud according to an embodiment.
Figure 3C:
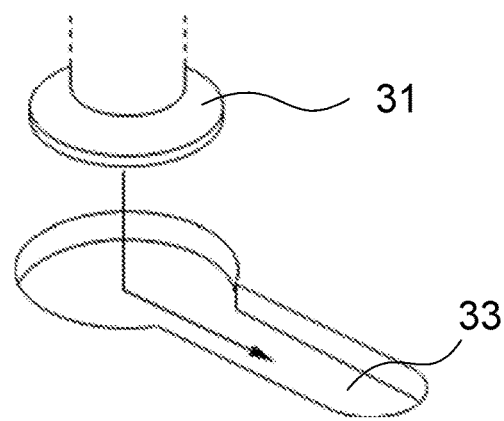
FIG. 3C is a schematic illustration of a stud inserted into a groove.

FIGS. 3A-3C illustrate an embodiment wherein the movable connection in the device 10 is implemented using studs and grooves. According to the embodiment, at least one fastening area 221 of the supporting layer 211 comprises a stud 31, and at least one fastening component 222 of the body 22 comprises a groove 33 shaped to be operable in a movable connection with at least one of the studs 31. FIG. 3A is an angled view of the unattached supporting layer 211 with a stud 31 schematically taking place of the fastening area 221 according to an embodiment. FIG. 3B shows a side view of the same, wherein the stud is welded 34 to the supporting layer 211. The stud 31 can be made of stainless steel, which in combination with the supporting layer 211 comprising stainless steel provides a possibility to use welding. The stud 31 can also be made of any other suitable material, such as metal or plastic. FIG. 3C shows the stud 31 which is configured to be inserted into a groove 33 on the body 22. In an embodiment, the groove 33 is shaped as a keyhole to provide a movable connection with the stud 31. The groove 33 may provide a slightly larger space than the radius of the stud 31, allowing the stud 31 slight movement in all horizontal directions.

As it is clear to a skilled person, the fastening areas 221 comprising studs 34 and fastening components 222 comprising grooves 33 may also comprise other fastening elements.

In an embodiment, at least one fastening area 221 of the supporting layer 211 comprises a magnetic element, and at least one fastening component of the body 22 comprises a magnetic element configured to be operable in a movable connection with at least one magnetic element of the supporting layer. The magnetic elements may be areas of magnetic material on the supporting layer 211. In an embodiment, the supporting layer 211 comprises magnetic material at least in the fastening areas 221. The supporting layer 211 may also be made of magnetic material. This allows using a thin supporting layer 211. In embodiments presented below referring to FIGS. 3D-3E, the magnetic elements are shown separate from the supporting layer 211 for clarity purposes only. As it is clear to a skilled person, similar implementations are possible wherein the supporting layer 211 comprises magnetic areas which do not extend outside the layer.

Figure 3D:
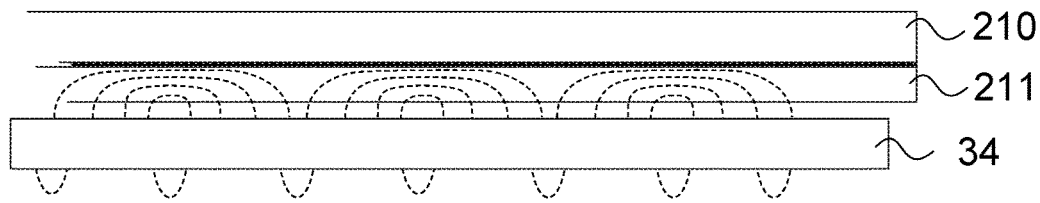
FIG. 3D is a side view of a supporting layer comprising a magnetic sheet element according to an embodiment.
Figure 3E:
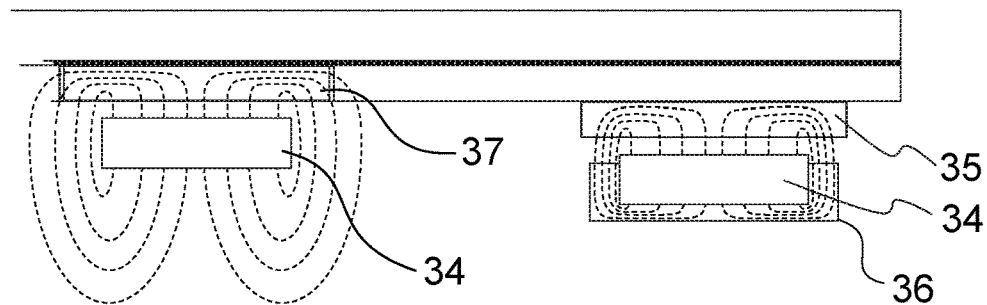
FIG. 3E is a side view of a supporting layer comprising a magnetic element with a magnetic core according to an embodiment.

FIGS. 3D and 3E illustrate various embodiments with magnetic elements mentioned above. These figures are side views of the supporting layer 211 on the bottom of the display stack 21. The magnetic elements may comprise neodymium or other rare earth materials, which can provide strong attraction enabling use of small magnets which can be inserted locally. According to an embodiment, the magnetic elements comprise soft rubber and have a prolonged shape. The soft rubber comprising magnetic material can be used on areas of bending.

FIG. 3D shows a magnetic element 34 as part of the fastening area of the supporting layer 211. On this figure, the magnetic element 34 is shaped as a stripe and may comprise a Halbach array. In an embodiment, the thickness of the magnetic element 34 is between 0.3 millimeters and 1 millimeter. The magnetic field lines are illustrated by dashed lines on the figures. FIG. 3E shows a magnetic element 34 as part of the fastening area of the supporting layer 211. The stripe 34 may comprise soft rubber and magnetic material. The soft rubber provides increased flexibility and reduced brittleness when the stripe 34 is bent.

FIG. 3E shows alternative embodiments of magnetic elements 34 as part of the fastening area 221 of the supporting layer 211. The elements 34 in this embodiment can be smaller and have, for example, a round shape. The supporting layer 211 on the left part of FIG. 3E comprises a magnetic core. The magnetic core can comprise soft iron or other suitable materials. The magnetic core can serve to confine the magnetic field and prevent undesired exposure of parts of the device 10, as well as external objects such as credit cards, to said field. The magnetic core element 36 can also be attached to the magnet 34 itself, along with an additional magnetic core element 35, as show on the right side of FIG. 3E. When the magnetic field is limited by the magnetic core 36, 37, attraction force can increase since the magnetic field is concentrated into the soft iron. Increased force can allow using smaller magnets and thereby saving space and weight. It is clear to a skilled person that the structure is not limited by what it presented on the drawings and in particular the embodiments shown on FIG. 3E are presented together for illustrative purposes only. Any combination of magnetic elements and magnetic cores can be used.

In an embodiment, magnetic elements 34 are magnets. Magnets can have a strong enough attraction force to keep the display stack 21 attached to the body 22, yet maintain flexibility on the joint and a movable connection.

Figure 4:
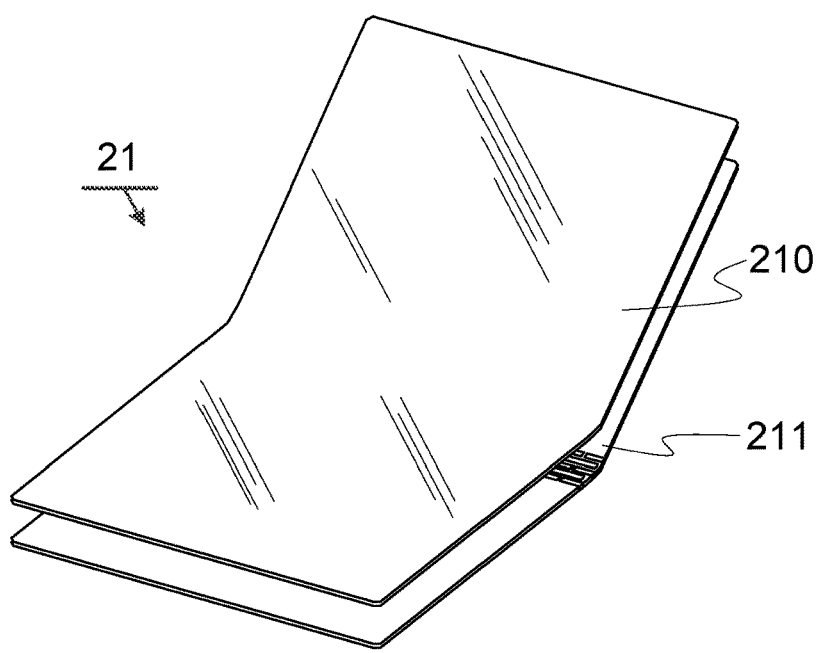
FIG. 4 is an angled view of a display stack according to an embodiment.

According to an embodiment, the supporting layer 211 of the display stack 21 may comprise a bending region itself, as illustrated on FIG. 4. This figure is an angled view of a display stack 21 wherein the active layers together with a window layer 210 are separated from the supporting layer 211, and a hinge is exposed on the supporting layer 211.

Figure 5A:
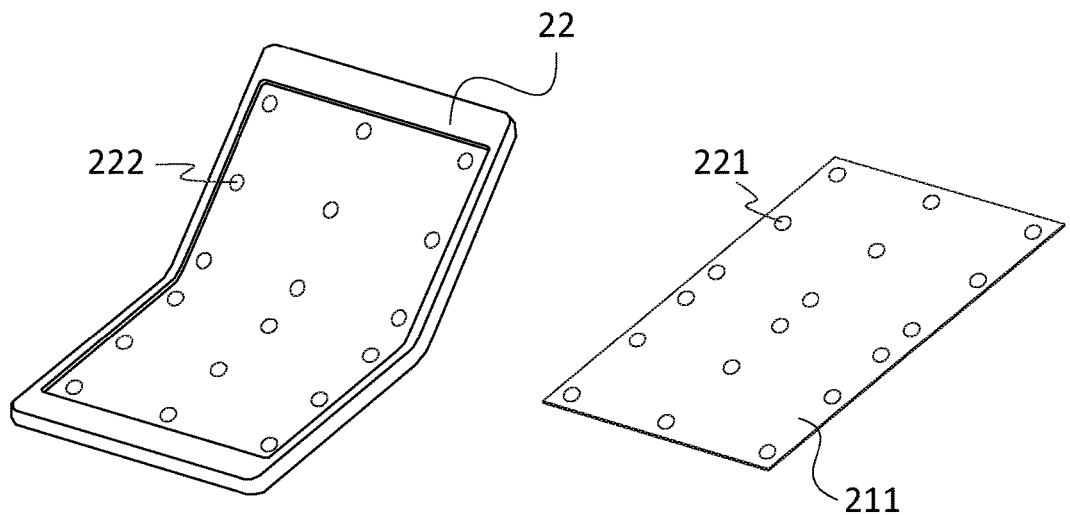
FIG. 5A is an angled view of a body and supporting layer with fastening components and areas according to an embodiment.

FIG. 5A illustrates an embodiment with a possible distribution of fastening components 222 on the body 21, and the fastening areas on the supporting layer 211 (flipped over in relation to the orientation or the body 21 for demonstration purposes). This distribution can be used with studs and magnets.

Figure 5B:
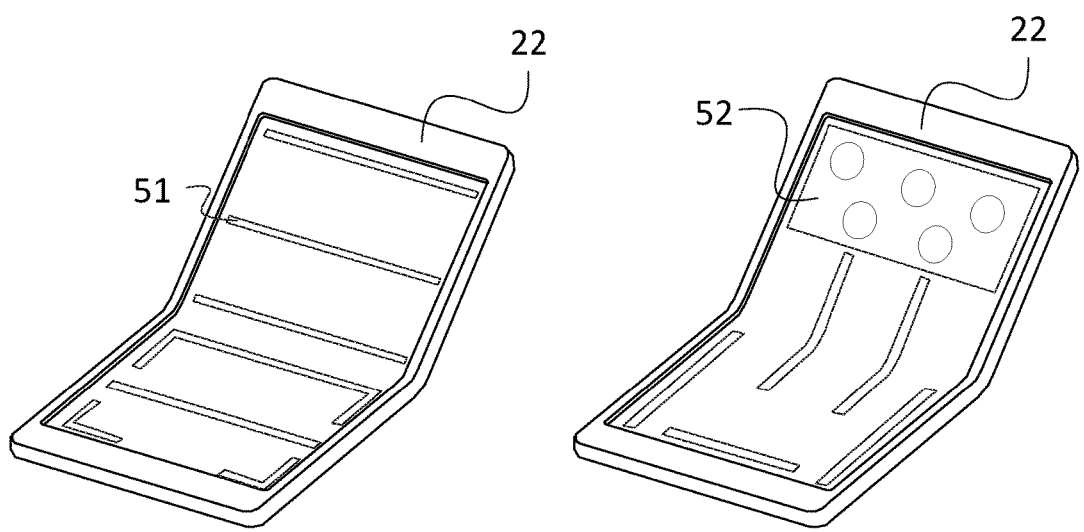
FIG. 5B is an angled view of a body comprising magnetic elements of various shapes according to an embodiment.

FIG. 5B shows two embodiments with distributions of magnetic elements 51, 52 across the body 22. This illustrates that the shape, size and positioning of the magnets 51 can vary and be tailored to a particular bending device. The circular holes in a magnetic shield 52 can provide reduced weight of the body 22.

In an embodiment, the fastening areas 221 and fastening components 222 comprise gel configured to provide a movable connection. In an embodiment, the display stack 21 is movably fixed to the body 22 with combination of the above embodiments. The display stack 21 may also be partially fixed to the body 22 by an adhesive, providing a movable connection only in certain areas of the device 10. The adhesive may be used, for example, to connect the display stack 21 to the bending region 23 of the body 21, since the relative movement may not occur around the bending region 23.

The device 10 according to any of the above embodiments may be implemented as a portable electronic device, for example a mobile phone, smart watch, tablet or laptop.

The above embodiments can provide a movable connection of the display stack to the body of an electronic device. This can have a technical effect on its repeatable foldability without buckling or other physical deformations of the display stack. A further effect can be that the device can be resistant to fall damage due to the "floating" connection which can absorb shock. The resulting device can also be easy to disassemble e.g. for maintenance.

Devices according to any of the above embodiments can be used in flexible electronic devices such as mobile phones, tablets, foldable laptop computers, e-readers and other devices. The devices may be embedded in or attached to a bendable or foldable electronic system.

FIG. 6 illustrates a method for assembling a bendable electronic device according to an aspect. The bendable electronic device may be a bendable display device. The method comprises providing 61 a display stack which comprises a supporting layer on the bottom, wherein the supporting layer comprising one or more studs. A body which comprises a bending region and keyhole-shaped grooves is then provided at 62. The method further comprises movably fixing 63 the display stack to the body by inserting the studs into the grooves.

FIG. 7 illustrates a method for assembling a bendable electronic device according to an aspect. The bendable electronic device may be a bendable display device. The method comprises providing 71 a display stack which comprises a supporting layer on the bottom, wherein the supporting layer comprising one or more magnetic areas. A body which comprises a bending region and magnetic elements is then provided at 72. The method further comprises movably fixing 73 the display stack to the body by bringing the magnetic elements into proximity or physical contact with the magnetic areas. The magnetic areas may comprise separate magnetic elements rigidly attached to the supporting layer.

The methods described above may have an effect of simplified assembly wherein adhesives are not necessary. A further effect is the ease of maintenance, due to the movable connection being more easily removed and then restored; for devices assembled according to the above methods.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The methods described herein may be performed by software in machine readable form on a tangible storage medium e.g. in the form of a computer program comprising computer program code means adapted to perform all the steps of any of the media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

According to an aspect, an electronic device is disclosed. The device comprises: a body comprising a bending region and a flexible display stack comprising at least one active layer and a supporting layer positioned on the bottom of the flexible display stack. The supporting layer of the flexible display stack comprises one or more fastening areas; the body comprises one or more fastening components; and one or more fastening components of the body are configured to be operable in a movable connection with one or more fastening areas of the flexible display stack.

According to an embodiment, the device is bendable about at least one axis in the bending region, and one or more fastening components of the body and one or more fastening areas of the flexible display stack are positioned within 2 centimeters from the bending region and opposite to each other.

According to an embodiment, alternatively or in addition to the above embodiments, at least one fastening area of the supporting layer comprises one or more studs, and at least one fastening component of the body comprises one or more grooves shaped to be operable in a movable connection with one or more studs.

According to an embodiment, in addition to the above embodiment, the one or more studs comprise stainless steel and are welded to the one or more fastening areas of the supporting layer.

According to an embodiment, the one or more grooves have a keyhole shape.

According to an embodiment, alternatively or in addition to the above embodiments, at least one fastening area of the supporting layer comprises a magnetic element, and at least one fastening component of the body comprises a magnetic element configured to be operable in a movable connection with at least one magnetic element of the supporting layer.

According to an embodiment, in addition to the above embodiment, one or more magnetic elements of the supporting layers and one or more magnetic elements of the body comprise neodymium. Alternatively or additionally, one or more magnetic elements of the supporting layers and one or more magnetic elements of the body may comprise soft rubber and have a prolonged shape.

According to an embodiment, in addition to the above embodiments, the supporting layer comprises a magnetic core between the magnetic elements and the other layers of the flexible display stack.

According to an embodiment, alternatively or in addition to the above embodiments, the body comprises a casing, the casing comprises the bending region of the body, and the casing encloses the body and the display stack at least from the bottom and two opposite sides.

Additionally to the above embodiment, the casing may also comprise a frame, wherein the frame encloses at least two edges of the display stack.

According to an embodiment, alternatively or in addition to the above embodiments, the supporting layer comprises stainless steel.

According to an embodiment, alternatively or in addition to the above embodiments, the supporting layer comprises a bending region.

In an embodiment, the bending region of the body and the bending region of the supporting layer comprise hinges.

According to an embodiment, alternatively to the above embodiment, the bending region of the body and the bending region of the supporting layer comprise elastic components.

According to an embodiment, alternatively or in addition to the above embodiments, the flexible display stack and the body are bendable more than 90 degrees.

According to an embodiment, alternatively or in addition to the above embodiments, the flexible display stack comprises an active organic light-emitting diode display, an active touch sensing layer and a window layer.

According to an embodiment, alternatively or in addition to the above embodiments, the device is implemented as a portable electronic device.

According to an aspect, a method for assembling a bendable electronic device comprising a display is disclosed. The method comprises: providing a flexible display stack which comprises a supporting layer positioned on the bottom, the supporting layer comprising one or more studs; providing a body which comprises a bending region and one or more grooves which have a keyhole shape; and fixing the flexible display stack to the body by inserting the studs into the grooves.

According to an aspect, a method for assembling a bendable electronic device comprising a display is disclosed. The method comprises: providing a flexible display stack which comprises a supporting layer positioned on the bottom of the display stack, the supporting layer comprising one or more magnetic areas; providing a body which comprises a bending region and one or more magnetic elements configured to be attracted to the magnetic areas of the supporting layer; and fixing the flexible display stack to the body by bringing the magnetic elements into proximity or physical contact with the magnetic areas.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the technical effects described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or device may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An electronic device comprising:
   a body comprising a bending region; and
   a flexible display stack comprising at least one active layer and a supporting layer positioned on a bottom of the flexible display stack;
   wherein:
     the supporting layer of the flexible display stack comprises one or more fastening areas;
     the body comprises one or more fastening components; and
     one or more fastening components of the body are configured to be operable in a movable connection with one or more fastening areas of the flexible display stack.

2. The electronic device as claimed in claim 1, wherein the electronic device is bendable about at least one axis in the bending region, and
   one or more fastening components of the body and one or more fastening areas of the flexible display stack are positioned within 2 centimeters from the bending region and opposite to each other.

3. The electronic device as claimed in claim 1, wherein at least one fastening area of the supporting layer comprises one or more studs, and at least one fastening component of the body comprises one or more grooves shaped to be operable in a movable connection with the one or more studs.

4. The electronic device as claimed in claim 3, wherein the one or more studs comprise stainless steel and are welded to the one or more fastening areas of the supporting layer.

5. The electronic device as claimed in claim 3, wherein the one or more grooves have a keyhole shape.

6. The electronic device as claimed in claim 1, wherein at least one fastening area of the supporting layer comprises at least one magnetic element, and at least one fastening component of the body comprises a second magnetic element configured to be operable in a movable connection with the at least one magnetic element of the supporting layer.

7. The electronic device as claimed in claim 6, wherein the at least one magnetic element of the supporting layer and the magnetic element of the body comprise neodymium.

8. The electronic device as claimed in claim 6, wherein the at least one magnetic element of the supporting layer and the magnetic element of the body comprise soft rubber and have a prolonged shape.

9. The electronic device as claimed in claim 6, wherein the supporting layer comprises a magnetic core between magnetic elements and other layers of the flexible display stack.

10. The electronic device as claimed in claim 1, wherein:
    the body comprises a casing,
    the casing comprises the bending region of the body, and
    the casing encloses the body and the flexible display stack at least from the bottom and two opposite sides.

11. The electronic device as claimed in claim 10, wherein the casing also comprises a frame, wherein the frame encloses at least two edges of the flexible display stack.

12. The electronic device as claimed in claim 1, wherein the supporting layer comprises stainless steel.

13. The electronic device as claimed in claim 1, wherein the supporting layer comprises a second bending region.

14. The electronic device as claimed in claim 13, wherein the bending region of the body and the second bending region of the supporting layer comprise hinges.

15. The electronic device as claimed in claim 13, wherein the bending region of the body and the second bending region of the supporting layer comprise elastic components.

16. The electronic device as claimed in claim 1, wherein the flexible display stack and the body are bendable more than 90 degrees.

17. The electronic device as claimed in claim 1, wherein the flexible display stack comprises an active organic light-emitting diode display, an active touch sensing layer and a window layer.

18. The electronic device as claimed in claim 1 implemented as a portable electronic device.

19. A method for assembling a bendable electronic device comprising a display, the method comprising:
    providing a flexible display stack which comprises a supporting layer positioned on a bottom of the flexible display stack, the supporting layer comprising one or more studs;
    providing a body which comprises a bending region and one or more grooves which have a keyhole shape; and
    fixing the flexible display stack to the body by inserting the one or more studs into the one or more grooves.

20. A method for assembling a bendable electronic device comprising a display, the method comprising:
    providing a flexible display stack which comprises a supporting layer positioned on a bottom of the flexible display stack, the supporting layer comprising one or more magnetic areas;
    providing a body which comprises a bending region and one or more magnetic elements configured to be attracted to the one or more magnetic areas of the supporting layer; and
    fixing the flexible display stack to the body by bringing the one or more magnetic elements into proximity or physical contact with the one or more magnetic areas.

* * * * *